United States Patent [19]

Cante et al.

[11] 4,211,797

[45] Jul. 8, 1980

[54] DRY DOG FOOD OF IMPROVED PALATABILITY

[75] Inventors: Charles J. Cante, St. Anne; Russell Downhour; Lee P. Randall, both of Kankakee; Jeffrey D. Morgan, Peotone, all of Ill.

[73] Assignee: General Foods Corporation, White Plains, N.Y.

[21] Appl. No.: 865,757

[22] Filed: Dec. 29, 1977

[51] Int. Cl.$^2$ ............................................... A23K 1/00
[52] U.S. Cl. ........................................... 426/2; 426/99; 426/293; 426/302; 426/589; 426/623; 426/657; 426/805
[58] Field of Search ............... 426/2, 92, 302, 307, 426/601, 608, 623, 98, 656, 657, 805, 99, 589, 293

[56] References Cited

U.S. PATENT DOCUMENTS

| | | | |
|---|---|---|---|
| 3,119,691 | 1/1964 | Ludington et al. | 426/302 |
| 3,653,908 | 4/1972 | Buck et al. | 426/805 |
| 3,857,968 | 12/1974 | Haas et al. | 426/805 X |

*Primary Examiner*—R. B. Penland
*Attorney, Agent, or Firm*—Mitchell E. Alter; Daniel J. Donovan; Bruno P. Struzzi

[57] ABSTRACT

Dry dog foods are made more appealing to dogs by applying a surface coating of a blend of lipolyzed beef tallow and digest of beef. The coating is applied at a level of at least 4% and less than 8% based on the total weight of the dog food and will contain from 1 to 3 parts lipolyzed tallow and from 1 to 3 parts digest of beef. Preferably, the coating will contain from 2 to 3 parts of both the digest of beef and the lipolyzed beef tallow, and may contain up to four percent beef tallow.

7 Claims, No Drawings

DRY DOG FOOD OF IMPROVED PALATABILITY

BACKGROUND OF THE INVENTION

The present invention relates to dog food acceptability, and more particularly to an improved flavor system for surface coating on dry dog foods.

While the development and production of nutritious animal foods are quite well understood and pose few problems to the art, there is a continuing problem of making these formulations palatable. Accordingly, there is a present need to develop processes and formulations which increase the palatability of animal foods, especially pet foods, while at the same time maintaining their nutritional value. Where the offered foods are unpalatable, animals often pass them up. Traditionally, the most severe palatability and ration rejection problems have been associated with dry pet foods.

The use of palatability improving additives enables the pet food manufacturer to provide pets with rations of high palatability, yet use as raw materials high proportions of ingredients which are undesirable or even unfit for human consumption or which might be otherwise unpalatable to pets. The ability to improve the palatability of pet foods made of less desirable raw materials helps maintain the lowest possible cost for human foods by decreasing the demand for human food raw materials and increasing the economic value of the by-products of the human food industry.

Many attempts have been made to obtain increased palatability of pet foods by the addition of a variety of materials, and a number of publications suggest the use of animal fat, meat extracts or enzymatically treated fat or protein materials. For example, U.S. Pat. No. 3,119,691 to Ludington, Schara and Mohlie suggests coating a fat, a flavoring component and a dry gravy former onto a dry dog food. The gravy former will normally comprise a water soluble thickener and the flavor is disclosed as preferably being a liquid meat extract. The fat can, if desired, serve as a carrier for the dry gravy former or the flavoring component. In another patent, U.S. Pat. No. 3,857,968, to Haas and Lugay, there is disclosed a process for improving the palatability of the animal foods based upon an enzymatic treatment of a mixture of fat and protein. Also, in U.S. Pat. No. 3,653,908 to Buck and Smith, it is disclosed that the palatability of a soft-moist feline food can be improved by partially hydrolyzing the meat containing slurry from which it is formed to liberate flavorful amino acids.

There remains, however, a present need to develop further more effective and more economical means to improve the palatability of dry dog foods.

SUMMARY OF THE INVENTION

Accordingly, it is an object of the present invention to provide a new process and composition for improving the palatability of dry dog foods.

It is also an object of the present invention to provide a new, highly palatable dry dog food and process for preparing it.

The most specific object of the present invention is to provide an improved method for feeding a dog by the addition of a palatability improving composition to the food prior to consumption.

These and other objects are accomplished according to the present invention which provides a palatability improving composition for application to a dry dog food, the composition comprising: 0 to 4 parts tallow, 1 to 3 parts lipolyzed tallow, and from 1 to 3 parts digest of beef, the composition being adapted for application to a dry dog food at a level of from 4 to 8% based on the total weight of the dog food and to thereby significantly improve the palatability of the food when consumed by dogs.

DETAILED DESCRIPTION OF THE INVENTION

The term palatability is broad and encompasses all of the various properties of animal foods, such as dog foods, sensed by the consuming animal. Among these properties are texture, taste and aroma. It is believed that the present invention increases palatability as a whole, primarily through improving the taste and aroma of the food.

The palatability improving materials identified by this invention can enhance the attractiveness and acceptance by dogs of all types of foods formulated for them. However, the most practical utility of the present invention is found in the environment of dry pet foods and the following description will emphasize these as exemplary. It will be understood, however, that the present invention does have utility in other types of products such as soft-moist or canned products of otherwise conventional formulation.

There are several chunk style dry dog food products on the market today which are particularly appealing to the consumer due to their shelf stability and convenience. These products are specifically formulated using proteinaceous and/or farinaceous source ingredients, and are characterized by a porous structure and crunchy texture. The products may be served as is, but are preferably rehydrated with water prior to consumption by the dog. Typical of the dry dog food formulations which can be upgraded by the present invention are those described in U.S. Pat. No. 3,119,691. The palatability of these products is further enhanced by a coating of fat on the surface of the chunk or kib, over which coating may be applied a powdered gravy forming material based on gums, starches, coloring and flavoring material. Upon hydration, the gravy forming material serves to thicken and color the water thereby simulating a gravy or meat sauce.

The products of the type described in U.S. Pat. No. 3,119,691 are in fact especially desirable because they are designed to employ a coating which hydrates with water to form a flavorful gravy. Such products may be manufactured by preparing a mixture of farinaceous and/or proteinaceous ingredients with optional vitamin and mineral supplements, said mixture having a moisture content within the range of about 20 to 40% by weight.

The farinaceous ingredients will include a primary farinaceous ingredient which may be any of the more common grains, such as corn, wheat, barley, oats, etc., and their derivatives, including e.g., corn meal, red dog flour, wheat germ, etc. A preferred farinaceous ingredient may include hominy. Commonly the farinaceous ingredients will be present in amount of 30-65% of the total mass.

In the preferred embodiment the mixture will also include one or more proteinaceous ingredients of vegetable, animal or fish origin, typically soy bean meal, meat meal, or fish scrap. This ingredient, preferably present in amount of 25-40% of the total mixture, will provide the bulk of the desired protein content in the final product. In the preferred embodiment, the ratio of farinaceous ingredient to proteinaceous ingredient may be 2.5–0.8 say 1:1. The farinaceous ingredient and the proteinaceous ingredient together may comprise 55–95% of the total mixture.

It will be apparent that the proteinaceous ingredient will preferably be selected to provide both the necessary level or amount of protein and also the necessary composition. Preferably several proteinaceous ingredients will be present. More specifically, these ingredients will be selected to be complementary to each other and to the farinaceous ingredient whereby the final mixture is balanced with respect to desired amino acids. For example, the protein of corn is low in tryptophane, as essential amino acid, whereas fish meal is high in this component; similarly wheat is low in lycine whereas meat meal will provide this ingredient. Accordingly, mixtures of these complementary ingredients will preferably be used to provide the desired balance.

Other preferred ingredients in the product (typically present in total amount of 0.25–6% or 7%) may include: desired flavor ingredients typified by fish scrap (when this material is not used as the prime source of protein) or salt; coloring ingredients including iron oxide, etc., fibrous ingredients typified by beet pulp; and desired vitamins.

This mixture is processed by heating it above about 212° F. and subjecting it to superatmospheric pressure and masceration such as in an extruder, and extruding it through an extrusion die into the atmosphere. As the material issues from the die it expands into a porous, expanded product due to the pressure drop across the die and the flashing off of the water as steam. The extrudate is then cut into bite size kibs having a mean diameter within the range of about ¼ to ¾ inch, dried to a moisture content of less than about 10% by weight, coated with palatability enhancing material of this invention, and optionally a powdered gravy forming ingredient, and packaged.

To obtain proper coating, the digest of beef and lipolyzed beef tallow are blended prior to coating. Where it is desired, or necessary as in the case of puppy foods, to add a fat such as beef tallow, the fat is preferably blended with the lipolyzed beef tallow prior to addition of the digest of beef. The coating is applied in amounts necessary to give a total weight of from at least 4% to less than 8%, based on the total weight of the dog food and will contain from 1 to 3 parts lipolyzed tallow, from 1 to 3 parts digest of beef, and from 0 to 4 parts tallow. Preferably, the coating will contain from 2 to 3 parts of both the digest of beef and the lipolyzed beef tallow. At the most preferred levels of 2.5% of each of the digest of beef and lipolyzed tallow, tallow addition is not necessary from the standpoint of palatability but may be added in the amounts as may be necessary for nutritional balancing of the dog food.

After adding the palatability improver of this invention, a powderous gravy former of the type disclosed in U.S. Pat. No. 3,119,691 can be added, and the product can be subjected to a final drying step to reduce the moisture content of the product to an acceptable level if the coating operations have caused an undue increase.

The digest of beef component of this invention is prepared from fresh beef. The beef is subjected to proteolytic enzyme digestion in the manner as well known in the art, with reaction conditions controlled to obtain maximum flavor development. After obtaining the desired degree of digestion, the reaction mixture is stabilized by the addition of phosphoric acid in amounts effective to bring the pH of the digest to approximately 4.0. A preferred type of digest of beef shows the following on analysis:

| | |
|---|---|
| Moisture | 59–61% |
| Protein | 14–16% |
| Fat | 9–11% |
| Ash | 11.5–14.5% |
| pH | 2.8–4.2 |
| Density | Approximately 9 pounds/gallon |
| Color | light beige |
| Aroma | Characteristic meat aroma |

The lipolyzed tallow is made according to the procedure set forth in the aforementioned U.S. Pat. No. 3,857,968 to Haas and Lugay. The disclosure of this patent is hereby incorporated by reference. In summary, this patent discloses emulsifying a fat such as beef tallow, employing a protein material such as soy isolate or soy flour in the mixture, and enzymatically treating the mixture with lipase and protease under conditions effective to produce a reaction mixture which, when added to a pet food, will increase the palatability of the food.

The following examples are presented for the purpose of further illustrating and explaining the present invention and are not to be taken as limiting in any regard. Unless otherwise indicated, all parts and percentages are by weight.

EXAMPLE I

Two dog foods improved with the palatability enhancer of this invention were prepared and tested by a 15 dog panel against a control formulation having a coating thereon of 2% lipolyzed tallow and 2% tallow. The formulations are as follows:

| INGREDIENT | PARTS BY WT. | | |
|---|---|---|---|
| Kibs | Control | Test A | Test B |
| Whole Ground Corn | 40.007 | 4.007 | 40.007 |
| Meat & Bone Meal | 10.163 | 10.163 | 10.163 |
| Soybean Meal | 22.428 | 22.428 | 22.428 |
| Wheat Middlings | 20.949 | 20.949 | 20.949 |
| Red Dog Flour | 1.692 | 1.692 | 1.692 |
| Non-Iodized Salt | 1.314 | 1.314 | 1.314 |
| Vitamin Premix | 0.022 | 0.022 | 0.022 |
| Zinc Oxide | 0.073 | 0.073 | 0.073 |
| Coating | | | |
| Tallow | 2.0 | 2.0 | 2.0 |
| Lipolyzed Tallow | 2.0 | 2.0 | 2.0 |
| Digest of Beef | 0 | 1.5 | 3.0 |
| Carboxymethyl Cellulose | 0.24 | 0 | 0 |
| Caramel | .099 | 0.20 | 0.20 |
| Calcium Carbonate | .060 | 0 | 0 |
| Dried Beef Solubles | .030 | 0 | 0 |
| Dried Meat Solubles | .030 | 0 | 0 |
| Corn Flour | 0.480 | 0 | 0 |
| Kelco Xanthan | 0 | 0 | 0.100 |

The control formulation was prepared as in U.S. Pat. No. 3,119,691 except that a 10 inch Anderson expander was employed in place of the Wenger extruder.

The test samples were coated by first blending the tallow, lipolyzed tallow and digest of beef, and then spraying the blend onto the kibbles at the correct ratio. The gravy dust, including the other gravy phase materials, was then applied thereover.

The results of the test are as follows with consumption expressed in grams of food consumed per kilogram of body weight:

| Sample | Consumption |
|---|---|
| Control | 5.21 |
| Test A | 11.39 |
| Sample | Consumption |
| Control | 3.50 |
| Test B | 11.48 |

Thus, in both cases, the test foods prepared in accordance with the present invention were determined to be preferred to the control by the dogs.

EXAMPLE II

In another test, a control sample having the same formulation as the control in Example I was fed to a panel of 20 dogs per test versus test formulations having the following formulations:

| Kibs | Test C | Test D | Test E |
|---|---|---|---|
| Whole Ground Corn | 40.01 | 40.56 | 42.06 |
| Meat & Bone Meal | 10.16 | 10.16 | 10.00 |
| Soybean Meal | 22.43 | 25.57 | 13.84 |
| Wheat Midds | 20.95 | 17.16 | 20.95 |
| Whole Ground Wheat | — | 5.54 | — |
| Poultry Meal | — | — | 6.00 |
| Red Dog Flour | 1.69 | 1.69 | 1.69 |
| Non-iodized Salt | 1.31 | 1.31 | 1.31 |
| Vitamin Premix | 0.022 | 0.022 | 0.022 |
| Zinc Oxide | 0.073 | 0.073 | 0.073 |
| Iron Oxide | 0.146 | 0.146 | 0.146 |
| Coating | | | |
| Tallow | 2.00 | 2.00 | 2.00 |
| Lipolyzed Tallow | 2.00 | 2.00 | 2.00 |
| Digest of Beef | 3.00 | 3.00 | 3.00 |
| CMC | 0.24 | 0.24 | 0.24 |
| Caramel | 0.10 | 0.10 | 0.10 |
| Calcium Carbonate | 0.06 | 0.06 | 0.06 |
| Dried Beef Solubles | 0.03 | 0.03 | 0.03 |
| Dried Meat Solubles | 0.03 | 0.03 | 0.03 |
| Corn Flour | 0.48 | 0.48 | 0.48 |

The test results are as follows:

| | Sample | Consumption |
|---|---|---|
| DRY FEEDING | Control | 2.99 |
| | Test C | 9.92 |
| | Sample | Consumption |
| FED WITH WATER | Control | 4.29 |
| | Test D | 7.01 |
| | Sample | Consumption |
| DRY FEEDING | Control | 3.68 |
| | Test D | 8.49 |
| | Sample | Consumption |
| FED WITH WATER | Control | 2.50 |
| | Test E | 10.84 |
| | Sample | Consumption |
| DRY FEEDING | Control | 4.32 |
| | Test E | 11.41 |

Thus, again the palatability enhancer of this invention shows an improvement over control samples.

EXAMPLE III

In another series of tests, kibbled dog foods prepared in the manner of the control and test samples of Example I were fed to a panel of 9 dogs making twelve judgements per dog for a total of 108 judgements. The control formulations had no coating or only tallow coated in the amounts indicated. The samples were fed rehydrated with 1.5 times their weight of water. The average consumption differences, expressed in grams of food consumed per kilogram of body weight, are shown in the tables below.

GROUP 1
Control (0% tallow):

| | Coating (% of total food) | | | |
|---|---|---|---|---|
| Test Sample | Tallow | Lipolyzed Tallow | Digest of Beef | Avg. Cons. Dif. |
| F | 0 | 2.5 | 0 | 2.05 |
| G | 0 | 0 | 2.5 | 6.59 |
| H | 0 | 2.5 | 2.5 | 5.80 |

GROUP 2
Control (1% tallow):

| | Coating (% total food) | | | |
|---|---|---|---|---|
| Test Sample | Tallow | Lipolyzed Tallow | Digest of Beef | Avg. Cons. Dif. |
| I | 1 | 2.5 | 0 | 6.13 |
| J | 1 | 0 | 2.5 | 4.72 |
| K | 1 | 2.5 | 2.5 | 6.56 |

GROUP 3
Control (2% tallow):

| | Coating (% total food) | | | |
|---|---|---|---|---|
| Test Sample | Tallow | Lipolyzed Tallow | Digest of Beef | Avg. Cons. Dif. |
| L | 2 | 2 | 0 | 3.26 |
| M | 2 | 0 | 2.5 | 4.72 |
| K | 1 | 2.5 | 2.5 | 5.80 |

GROUP 3
Control (2% tallow):

| | Coating (% total food) | | | |
|---|---|---|---|---|
| Test Sample | Tallow | Lipolyzed Tallow | Digest of Beef | Avg. Cons. Dif. |
| L | 2 | 2 | 0 | 3.26 |
| M | 2 | 0 | 3 | 3.68 |
| N | 2 | 2 | 3 | 5.51 |

GROUP 4
Control (6% tallow):

| | Coating (% total food) | | | |
|---|---|---|---|---|
| Test Sample | Tallow | Lipolyzed Tallow | Digest of Beef | Avg. Cons. Dif. |
| O | 2 | 2 | 3 | 3.04 | 7.84 |
| P | 0 | 2.5 | 2.5 | 4.76 | 6.27 |
| Q | 1 | 2.5 | 2.5 | 3.49 | 5.72 |

Again the positive effect of the palatability enhancer of this invention is shown against a variety of control formulations.

The above examples and explanation have been presented for the purpose of teaching those skilled in the art how to practice the present invention and are not meant to describe all those obvious variations and modifications which will become apparent to the skilled worker upon reading this disclosure. It is intended, however, that all such obvious modifications and variations are to be included within the scope of this invention which is defined by the following claims.

What is claimed is:

1. In an improved, nutritionally balanced dry dog food comprising from 30 to 65% by weight of the food of farinaceous materials and from 25 to 40% of the total food of proteinaceous materials, the improvement which comprises:
   a coating of a palatability improving composition comprising 0 to 4 parts tallow, 1 to 3 parts of enzyme lipolyzed tallow, and from 1 to 3 parts of a proteolytic enzyme digest of beef adjusted to approximately pH 4.0 the palatability improving composition being present at a level of from 4 to 8% based on the total weight of the dog food, the amount thereof being effective to significantly improve the palatability of the food when consumed by dogs.

2. An improved dry dog food according to claim 1 wherein the palatability enhancing composition comprises from 2 to 3 parts lipolyzed tallow and 2 to 3 parts beef digest.

3. An improved dry dog food according to claim 2 which also comprises a coating of a water soluble thickener and color which forms a gravy-like sauce when mixed with water.

4. An improved dry dog food according to claim 3 wherein the proteinaceous materials comprise meat meal.

5. An improved method of feeding a dog which comprises:
   (a) preparing a dog food by
      (i) extruding a kibbled dog food containing from 30 to 65% by weight farinaceous ingredients and from 25 to 40 % proteinaceous ingredients, and
      (ii) applying to the kibbled dog food from 4 to 8% of a platability enhancing composition comprising: 0 to 4 parts tallow, 1 to 3 parts of enzyme lipolyzed tallow, and from 1 to 3 parts of a proteolytic enzyme digest of beef adjusted to approximately pH 4.0; and
   (b) feeding the dog food to a dog.

6. A method according to claim 5 wherein the proteinaceous ingredients comprise meat meal.

7. A method according to claim 6 wherein the palatability enhancing composition comprises from 2 to 3 parts lipolyzed tallow and from 2 to 3 parts digest of beef.

* * * * *

UNITED STATES PATENT OFFICE
CERTIFICATE OF CORRECTION

Patent No. 4,211,797            Dated   Jul. 8, 1980

Inventor(s)  Charles John Cante et al.

It is certified that error appears in the above-identified patent and that said Letters Patent are hereby corrected as shown below:

In Col. 3, Line 15 change "as" to --an--
In Col. 4, Line 43 of chart under Test A change "4.007" to --40.007--

Signed and Sealed this

Sixteenth Day of June 1981

[SEAL]

Attest:

RENE D. TEGTMEYER

Attesting Officer     Acting Commissioner of Patents and Trademarks